T. POWELL.
Friction-Clutch.

No. 216,758.    Patented June 24, 1879.

WITNESSES:
L. F. Bell
George Rennitt

INVENTOR.
Thomas Powell,
Ben. E. O'Knnik,
his Attorney

N. PETERS, PHOTO-LITHOGRAPHER, WASHINGTON, D. C.

UNITED STATES PATENT OFFICE.

THOMAS POWELL, OF MARTINSVILLE, INDIANA.

IMPROVEMENT IN FRICTION-CLUTCHES.

Specification forming part of Letters Patent No. 216,758, dated June 24, 1879; application filed March 3, 1879.

*To all whom it may concern:*

Be it known that I, THOMAS POWELL, of Martinsville, in the county of Morgan and State of Indiana, have invented a new and useful Improved Friction Device for locking the band-wheel of a sewing-machine, or wheels of other machines, to their shafts, so as to revolve the shaft with the wheel, or to unlock the wheel, so as to stop the shaft while the wheel revolves, of which the following is a description, reference being had to the accompanying drawings.

My invention relates to a friction device or clutch which is designed to lock the band-wheel and shaft together when it is desired to revolve the shaft with the wheel, and also to unlock said wheel from the shaft when it is desired to revolve either, or to stop the shaft and revolve the wheel, which latter is frequently required in various machines, especially in sewing-machines where bobbins have to be wound.

My invention consists of the new construction and arrangement of parts, and in the new combination of new and old elements that are deemed essential for operating my newly constructed friction device, as will be hereinafter fully described and set forth.

Figure 1:
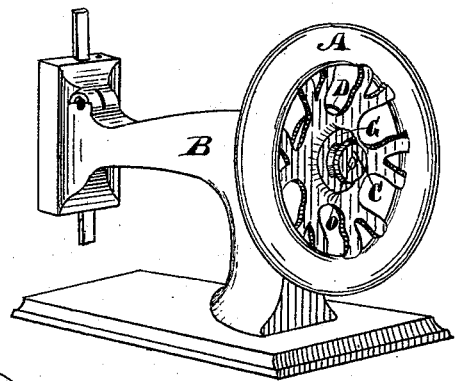
Figure 2:
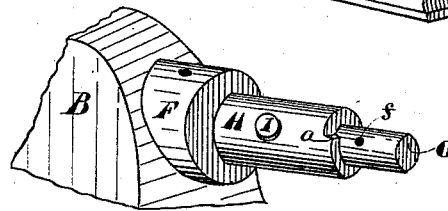
Figure 3:
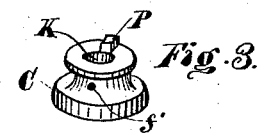
Figure 5:
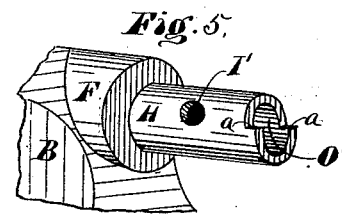
Figure 4:
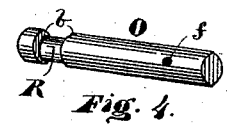

In the accompanying drawings, in which like letters of reference in the different figures indicate like parts, Figure 1 represents a perspective view of a sewing-machine embodying my invention. Fig. 2 is a perspective view, showing the end of the shaft and the friction device with the band-wheel removed. Fig. 3 is a perspective view of the knob used for operating the friction device. Fig. 4 represents the eccentric-shaft. Fig. 5 represents a perspective view, showing the end of the shaft with the friction-block and eccentric-shaft removed; and Fig. 6 represents an enlarged sectional view taken vertically and longitudinally through the center of the hub of the band-wheel and shaft, showing the arrangement of the friction device and its operating parts more fully.

Referring to the drawings, B represents any ordinary sewing-machine. H is a shaft, operating in bearings F, said shaft projecting from the machine far enough to receive the band-wheel A, as shown. One end of the shaft H is drilled or bored out, as shown at O', forming a hollow cylinder, and about one-half of the rear end of the cylinder O' or shaft H is filed or dressed off, forming two shoulders or stops, *a a*, as shown. About midway between the end of the shaft H and the inner end of the hole O' is another hole, I', drilled through the cylinder, for the purpose of receiving and holding the friction-block I. The shaft O is provided with an eccentric, R, near one end, and a pin-hole, *f*, near the other end, and said shaft is made to fit snugly in the hole O', yet sufficiently loose to permit the shaft to be partially rotated in the cylinder. The eccentric R is adjusted in line with the hole I' of the shaft H, to receive the inner end of the friction-block I. Said friction-block I, when inserted in the hole I', fits between the sides *b* of the eccentric, which prevents the shaft O from being pulled out unless the block I is removed.

Figure 6:
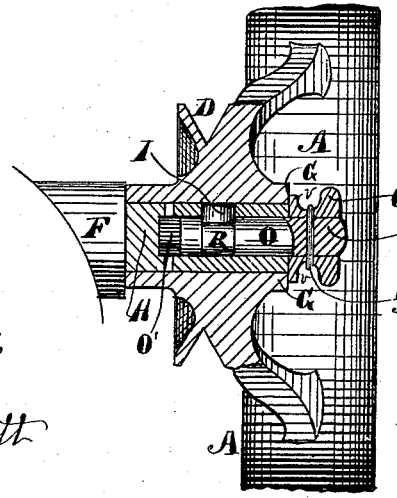

When the block I is inserted in the hole I' and its lower end resting on the eccentric R, then its upper end is dressed off to correspond with the outer surface of the shaft H, thus permitting the band-wheel A to be slipped on the end of the shaft over the friction-block, as shown in Fig. 6.

The knob C may be of any form most convenient to handle, and is provided with a hole, K, to fit on the shaft O, and may be secured to said shaft by the pin $f^2$, which passes through the hole $f^1$ in the knob, and also through the hole *f* in the shaft O; or the knob may be secured in any other ordinary manner. The flange *v* of the knob is large enough to project beyond the circumference of the shaft H and form a washer, to prevent the wheel A from working off said shaft, as shown. On the face of the flange *v* of said knob is a projecting lug, P, which is designed to operate in the space above the shoulders or stops *a a* at the end of the shaft H and form a stop for the knob, and prevent the eccentric from being turned only sufficient to lock or unlock the wheel A and shaft H. The lug P, when it strikes one of the stops *a*, also indicates when the friction-block I is released from contact with the hub of the wheel.

The operation of my newly-constructed friction device is as follows, to wit: If it is desired to rotate the shaft H at the same time that the wheel A is revolved, then the knob C is turned, and with it the shaft O and the eccentric R. The eccentric R presses the block I outward against the inner surface of the hole in the hub of the wheel A, thus locking the shaft and wheel, causing the shaft to revolve when the wheel A is revolved.

Should it be desired to stop the shaft and other machinery except the wheel A for any purpose whatever, then the knob C is turned in the opposite direction, thus causing the eccentric R to revolve and the block I to be released from contact with the hub. Thus the wheel is free to revolve on the shaft H, while said shaft remains at rest; or the shaft H may be revolved and the wheel remain at rest. When the knob C is turned so as to unlock the wheel from the shaft, the lug P strikes against the stop $a$ of the shaft H, and prevents the shaft O from turning further in the hole O'.

It is obvious that the lug P and stops $a$ may be dispensed with; still I prefer to retain them, as a means of preventing the eccentric R from turning too far in the hole O'. They may also prevent confusion as to which way the knob should be turned in order to lock or unlock the shaft.

What I claim as new, and desire to secure by Letters Patent, is—

1. The shaft H, provided with a hole, O', in its end and a hole, I', through its periphery, combined with the friction-block I and eccentric-shaft O R, as and for the purpose described and set forth.

2. The shaft H, provided with a hole, O', in its end and a hole, I', through its periphery, combined with the friction-block I, the eccentric-shaft O R, and wheel A, as described, for the purpose specified.

3. The shaft H, provided with a hole, O', in its end and a hole, I', through its periphery, combined with the friction-block I, and the eccentric-shaft O R, wheel A, and knob C, as described, for the purpose specified.

4. In combination with the shaft H, having an eccentric-shaft, O R, in its end, provided with a knob, C, and a friction-block, I, the wheel A and hub F, whereby said eccentric-shaft is retained in position in the shaft H, and the wheel A prevented from working off the shaft, and the wheel also secured to or released from the said shaft, so as to revolve the shaft with the wheel, or the wheel on the shaft, or the shaft in the wheel, as described, and for the purpose specified.

5. The knob C, provided with lug P, combined with the eccentric-shaft O R and shaft H, having shoulders $a\ a$ at its end, and a friction-block, I, as and for the purpose specified.

In testimony whereof I have signed my name to this specification in the presence of two subscribing witnesses.

THOMAS POWELL.

Witnesses:
 E. O. FRINK,
 GEORGE RENNETT.